July 28, 1970  W. P. SCHOENING  3,521,753
FILTERING AND HEATING OF LIQUIDS BY USE OF A
FLEXIBLE CELLULAR BLANKET Filed April 30, 1968  4 Sheets-Sheet 4

United States Patent Office 3,521,753
Patented July 28, 1970

3,521,753
FILTERING AND HEATING OF LIQUIDS BY USE OF A FLEXIBLE CELLULAR BLANKET
Werner P. Schoening, 10906 Green Arbor,
Houston, Tex. 77034
Filed Apr. 30, 1968, Ser. No. 725,284
Int. Cl. B01d 35/18
U.S. Cl. 210—185       6 Claims

ABSTRACT OF THE DISCLOSURE

A foldable, flexible, cellular blanket having connected cells containing heating means and filtering means. Preferably the blanket is made of sheets of reinforced plastic laminate having non-woven fibers arranged so that they can respond to stresses by sliding. A proposed use is for conditioning swimming pool water.

---

This invention relates to a cellular blanket for heating and filtering liquids.

More specifically, it concerns a foldable, flexible, cellular blanket comprising connected cells containing heating means and filtering means. This blanket will heat and filter liquids in a single process.

This is a combined heating and filtering device, for example for swimming pools, which may be made by laminating two strong sheets together, leaving between them a series of interconnected cells, so as to form a "blanket." Some or all of these cells contain heating and/or filtering means so that the "blanket," as a whole, can perform both functions.

Preferably the sheets are made of reinforced plastic laminate having non-woven fibers arranged so that they can respond to stresses by sliding, thus forming bunches or ropes which stop further propagation of tears or the like.

For heating and filtering liquids, normally two different kinds of equipment are required: (a) a heater, and (b) a filter.

For example, the heating of a swimming pool is often accomplished by steam being led into the water, adding hot water or heating part of the wall contiguous to the water, or immersing an electric or combustion heater. For these methods a great amount of auxiliary equipment is required, and there is also relatively expensive installation. Besides all this, the pool would need a separate means for filtering the water.

An object of this invention is a simplified heating means which at the same time can be combined with filtering means.

Another object is a rugged and durable device for heating and filtering liquids that is exceptionally light.

Another object is a portable, flexible, foldable heating and filtering device.

Further objects will become apparent as the following detailed description proceeds.

In accordance with my invention, I prepare a foldable blanket having contiguous integral cells, all or some of which contain heating and filtering means.

Figure 1:
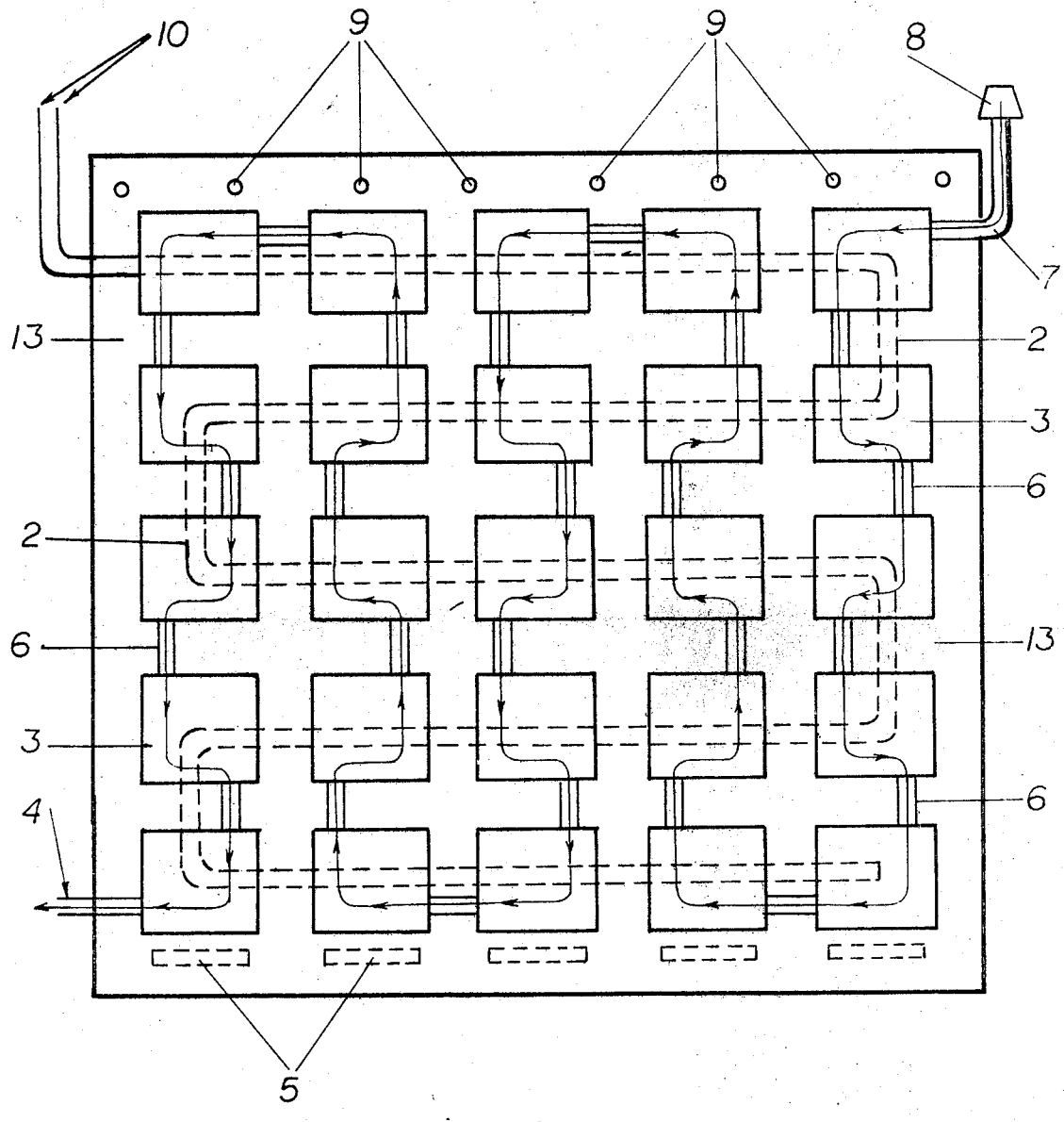
Figure 2:
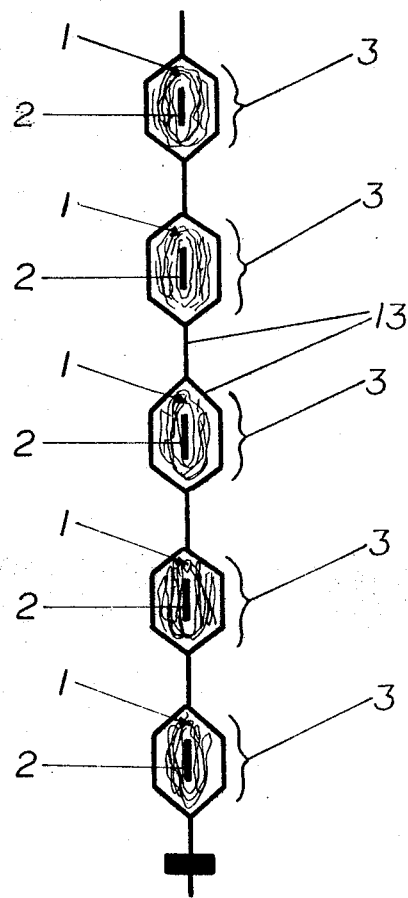
Figure 3:
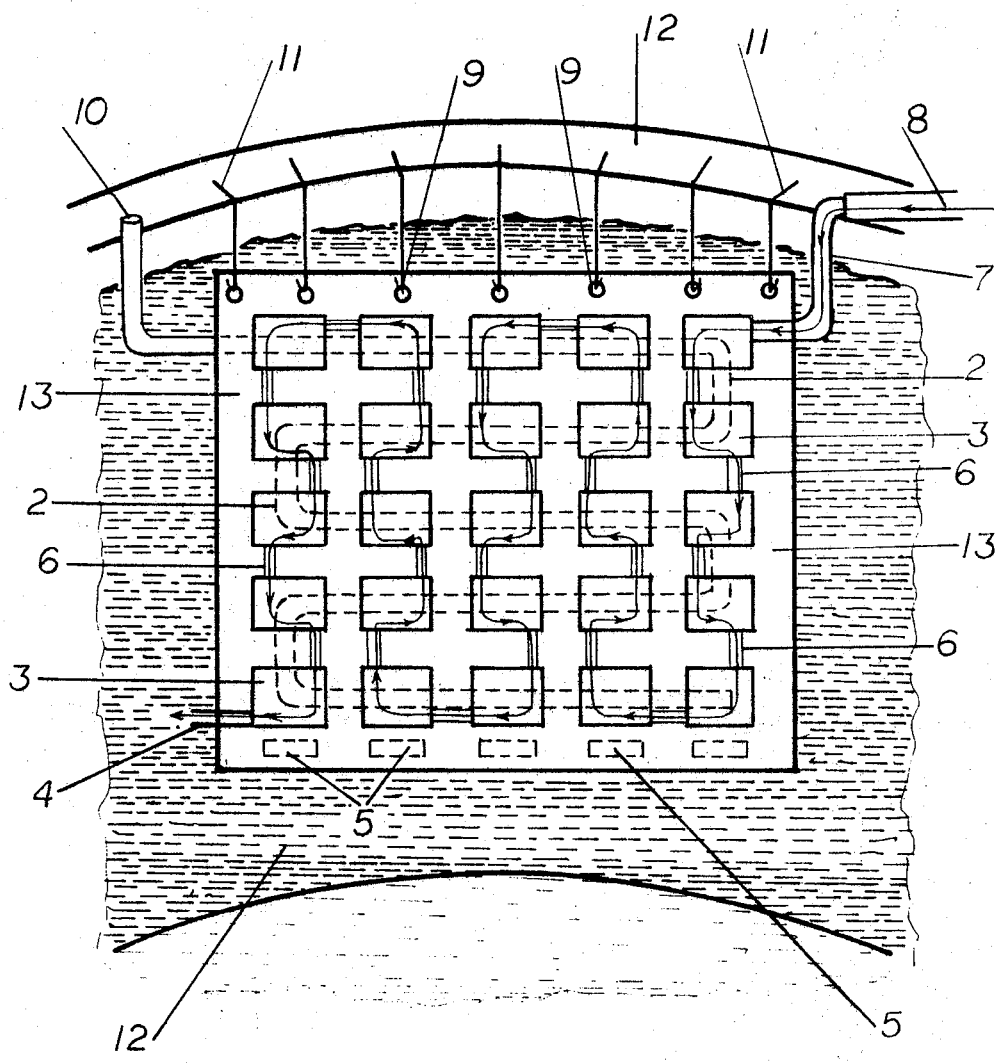
Figure 4:
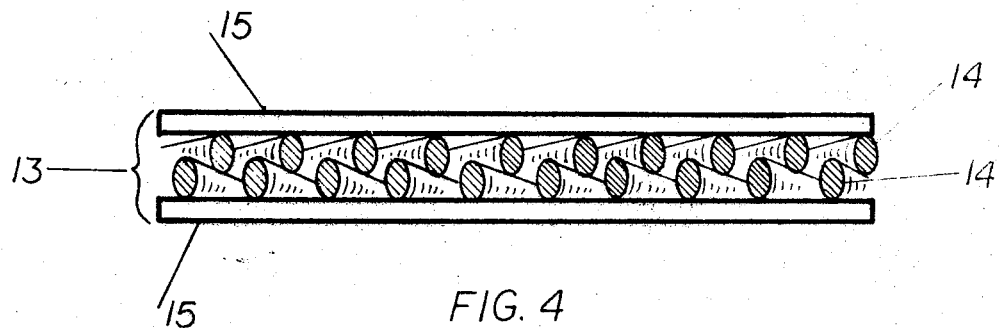
Figure 5:
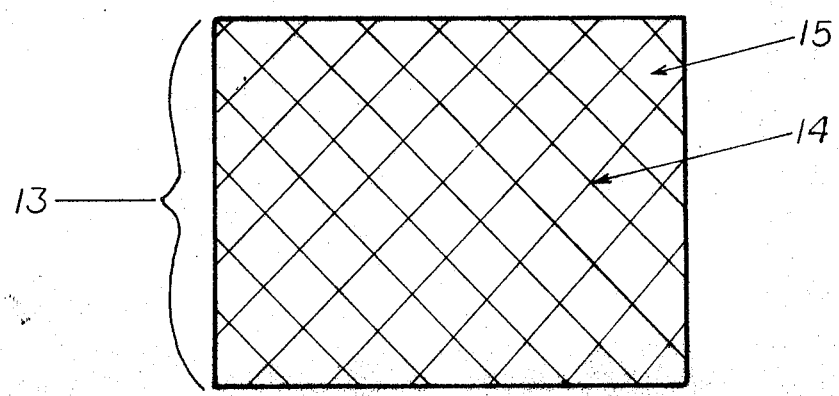
Figure 6:
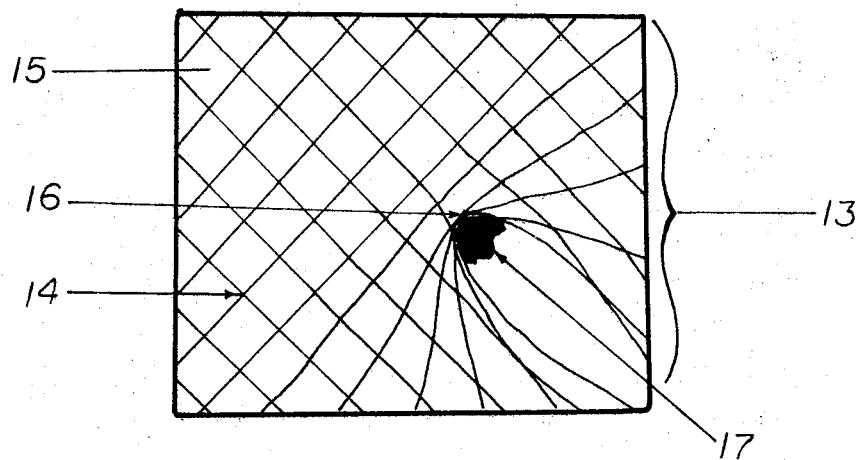

Reference will be made in this description to drawings in which:

FIG. 1 is a front view of the cellular blanket.
FIG. 2 is a cross-sectional view of the cellular blanket.
FIG. 3 is a front view of the cellular blanket immersed in a swimming pool.
FIG. 4 is a cross-sectional view of the laminated sheet material that comprises the major portion of the blanket.
FIG. 5 is a top view of the laminated material.
FIG. 6 is a top view showing how the laminated sheet material resists tear.

This blanket is fabricated out of a laminated sheet material 13. At least two layers of plastic film 15 are laminated together with non-woven fibers 14 between the layers. These fibers 14 are in at least two layers and are parallel within each layer. The fibers 14 are slidable so that when they are exposed to a destrcutive stress 17, such as a pointed rock or nail, they slide together to form a rope 16 in front of the tear, thus preventing the tear from enlarging. This is shown in FIG. 6.

Application of such a laminated material 13 makes this invention light, yet durable.

The means for circulating the liquid 8 could, for example, be a gravity feeding device, a pump, a water generator, or the like. The liquid is introduced through an intake 7 into the first of preferably at least ten sequentially connected cells 3. These cells are constructed in pocket-type configuration with an opening for intake of liquid 7 and another opening 6 to pass the liquid on to another cell. Within the cell 3 is a filtering means 1, which could range anywhere from cellulose flock, to hog or human hair, or to nylon gauze. The use of any specific type of filtration material 1 is not essential to this invention. As the liquid 8 passes through the cell, it is filtered. Also located within the cell is a heating means 2. This heating means is preferably an electric means 10 with a resistance element 2. Again, however, the specific heating means is not important. The basic idea is to employ a heating means to heat the liquid. If the heating means immediately precedes the filtering means, the heating of the liquid will facilitate passage through the filter, because of reduced viscosity.

As the liquid leaves the first cell, it passes through a passage 6 into another cell, where the process of filtering and heating is repeated. This process continues, with the liquid in turn passing onto each sequentially connected cell 3, until it has passed through each cell, and then has been discharged through a passage 4 similar to those linking the cells.

These passages can be made in numerous ways. When the laminated sheets 13 are in turn laminated together so as to encolse the heating and filtering means in the cells, tubes can be placed where the passages are desired. The tubes can be made of a polyvinyl alcohol so that they dissolve when water is passed through, leaving the passage, or the tubes can be made of a strong plastic or aluminum or steel, which would remain in the passages. The length of the tubes can vary, with the possibility of them being very small.

If the blanket is immersed in the liquid, as in a swimming pool 12, weights 5, such as lead, are laminated between the laminated material 13, so as to cause the bottom to sink, thus leaving the blanket in a vertical position. Holes 9 are placed in the top edge of the blanket so that hooks 11 can be used to suspend the blanket in a vertical postion when it is immersed in the liquid.

I claim:

1. A flexible foldable blanket for conditioning a liquid, comprising an inlet, a series of sequentially interconnected cells formed by heatsealing together two plastic films so that the heat seals constitute the separating walls, passages permitting the flow of fluid thru the system of cells thus formed, and an outlet to remove the circulating medium from said blanket.

2. The blanket of claim 1, comprising means for changing the temperature of the said fluid as it passes through the said system of cells.

3. The blanket of claim 1, comprising a filtering medium positioned within the said cells, so as to filter the fluid circulating therethrough.

4. A system comprising a container of liquid, in which is immersed the blanket of claim 1, the liquid in said system and the liquid circulating through said blanket having different temperatures.

5. A system comprising a container of liquid, in which is immersed the blanket of claim 3, the liquid of the said container being continuously filtered by circulation through the cells in said blanket.

6. The flexible foldable blanket of claim 1, in which the said plastic films are laminates of at least two films each, laminated together with non-woven fibers between said films.

References Cited
UNITED STATES PATENTS

| 1,349,112 | 8/1920 | Weiss | 210—483 X |
| 2,302,552 | 11/1942 | Johnson | 210—317 X |
| 3,212,640 | 10/1965 | Anderson | 210—185 |

FOREIGN PATENTS 634,977   1/1962   Canada.

JOHN W. ADEE, Primary Examiner

U.S. Cl. X.R.

210—195, 196, 335, 483